United States Patent [19]

Lundberg

[11] 4,379,914
[45] Apr. 12, 1983

[54] POLYCAPROLACTONE POLYMERS

[75] Inventor: Robert D. Lundberg, Bridgewater, N.J.

[73] Assignee: Exxon Research and Engineering Co., Florham Park, N.J.

[21] Appl. No.: 332,813

[22] Filed: Dec. 21, 1981

[51] Int. Cl.³ .................. C08G 63/08; C08G 63/10
[52] U.S. Cl. .................................. 528/354; 528/355; 560/185
[58] Field of Search ................. 528/354, 355; 560/185

[56] References Cited
U.S. PATENT DOCUMENTS 2,890,208 6/1959 Young et al. .................... 528/354 X
3,169,945 2/1965 Hostettler et al. ............... 528/354 X
3,186,971 6/1965 Hostettler et al. ............... 528/354 X
3,509,102 4/1970 Horn et al. ...................... 528/355 X
3,684,771 8/1972 Braun .............................. 528/355 X Primary Examiner—Earl A. Nielsen
Attorney, Agent, or Firm—Richard E. Nanfeldt

[57] ABSTRACT

The instant invention relates to a process for the formation of polylactone polymers which are terminated on one end by a tertiary amine group and on the other end by a hydroxyl group. An $\epsilon$-caprolactone is reacted with a diamine in the presence of a catalyst, wherein one of the amine groups of the diamine is a tertiary amine and the other amine group is primary or secondary.

6 Claims, No Drawings

POLYCAPROLACTONE POLYMERS

FIELD OF THE INVENTION

The instant invention relates to a process for the formation of polylactone polymers which are terminated on one end by a tertiary amine group and on the other end by a hydroxyl group. An ε-caprolactone is reacted with a diamine in the presence of a catalyst, wherein one of the amine groups of the diamine is a tertiary amine and the other amine group is primary or secondary.

BACKGROUND OF THE INVENTION

It has been known that polymers of ε-caprolactone can be readily prepared via reactions of the ε-caprolactone monomer with a hydroxyl or amine initiator can lead to a hydroxyl terminated polymer, as shown by the equation:

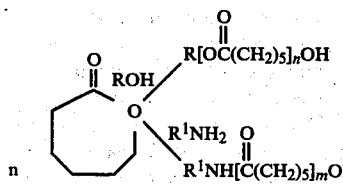

Similar types of reactions can lead to a variety of different molecular weight polymers; however, generally the most desirable polymers have number average molecular weights as measured by GPC of about 1,000 to about 5,000. The above synthesis is a very desirable one because the functionality is preserved extremely well, and one achieves, in the product, essentially all the hydroxyl groups that are added prior to the polymerization.

The use of caprolactone as a polymerizing monomer to obtain very high molecular weight polymers is also well-known. In these cases, molecular weight on the order of 50 to 100,000, are readily obtained by the use of certain types of catalysts. In those polymerizations, initiators are normally not employed or employed at very low levels. Typically, in any of these two aforementioned polymerization processes, the degree of polymerization is determined by the amount of initiator employed as follows:

$$\text{Degree of Polymerization} = DP = \frac{[\text{Moles of } \epsilon\text{-caprolactone}]}{[\text{Moles of Initiator}]}$$

The polymerization of these lactone monomers including ε-lactone yields a hydroxyl terminated polymer. These aforementioned processes do not teach one how to obtain a polymer which is terminated, at least at one end, by an amine group. For example, if an amine, such as a primary amine, n-butyl amine, is utilized to initiate ε-caprolactone polymerization, a product is obtained which has a hydroxyl group on one end and an amide group on the other. In other words, the reaction always leads to a propagating species which is hydroxyl terminated. If one employs a diamine, essentially the same situation ensues, that is, one gets a propagating species which has a hydroxyl group on each end of the polymer chain. For many applications this is desirable, but it does limit the utility of the caprolactone technology primarily to hydroxyl functionality.

The instant invention describes a process which permits the preparation of a new class of polylactones derived from lactone monomers. The process, as described herein, involves the use of a diamine in which one of the amines is a tertiary amine and the other amine is a primary or secondary amine. The resulting polymeric products have a tertiary amine at one end and a hydroxyl group at the other end, as shown in the following equation:

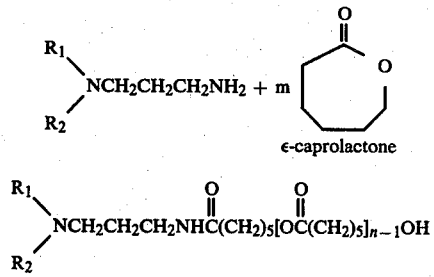

wherein n=1 to 500.

SUMMARY OF THE INVENTION

The instant invention relates to a process for the formulation of polylactones which are terminated on one end by a tertiary amine group, and on the other end by a hydroxyl group. An ε-caprolactone is reacted with a diamine in the presence of a catalyst, wherein one of the amine groups of the diamine is a tertiary amine, and the other amine group is primary or secondary. The products of this instant invention can be used in a number of different applications. For example, one of the primary objectives of obtaining these materials is to use them to neutralize certain sulfonic acid-containing polymers, for example, lightly sulfonated polystyrene or fully sulfonated polystyrene, available as a sulfonic acid, moieties. These sulfonic acid polymers can be neutralized with these materials to give an amine-neutralized, sulfonated derivative which has a variety of different applications. Similarly a sulfonated EPDM can be employed, in combination of these materials, to give a new variety of amine-neutralized, sulfonated elastomeric polymers.

Additionally, these materials can be combined with other low molecular weight sulfonic acid moieties, such a dodecyl benzene sulfonic acid, to give an interesting new class of surfactants which contain ester groups, hydroxyl groups and amine-neutralized sulfonate groups.

GENERAL DESCRIPTION OF THE INVENTION

The instant invention generally relates to a unique and novel class of new water insoluble polycaprolactone compounds which are useful in the art of neutralizing organic sulfonic acids or polymeric sulfonic acids. The polyester compounds of the instant invention are terminated at one end by a tertiary amine group, and on the other end by a hydroxyl group.

These polyesters are formed by the reaction of an ε-caprolactone with an organic diamine in the presence of a catalyst. The anhydrous ε-caprolactone and the organic diamine, in the presence of the catalyst, are reacted in a reaction vessel in the absence of a solvent at a temperature of about 50° C. to about 200° C., more preferably about 75° C. to about 180° C., and most preferably about 90° C. to about 160° C. for a sufficient period of time to effect polymerization. Optionally, a solvent for the monomer and/or polymer can be employed to control viscosity and/or reaction rate.

The reaction of the ε-caprolactone with the diamine can be generally depicted by the equation:

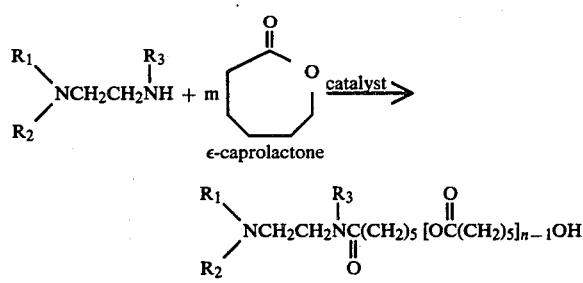

wherein n=1 to 500, $R_1$ or $R_2$ are selected from the group consisting of alkyl and cycloalkyl groups having about 1 to about 20 carbon atoms, more preferably about 1 to about 12 carbon atoms, and aryl groups, and $R_3$ is selected from the group consisting of hydrogen, alkyl and cycloalkyl groups having about 1 to about 20 carbon atoms, more preferably about 1 to about 12, and aryl groups. Typical, but nonlimiting examples of useful diamines are:

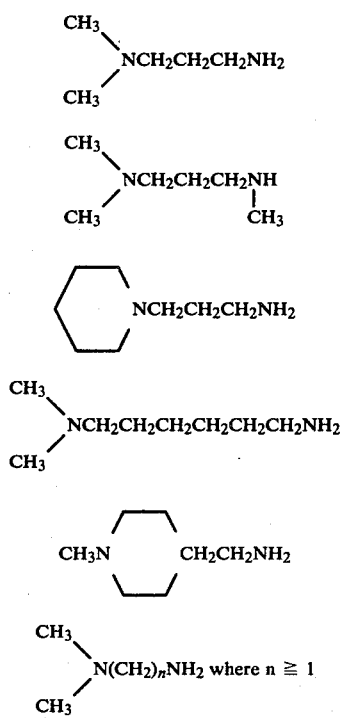

Catalysts useful in the promotion of the above-identified reaction are selected from the group consisting of stannous octanoate, stannous hexanoate, stannous oxalate, tetrabutyl titanate, a variety of metal organic based catalysts, acid catalysts and amine catalysts, as described on page 266, and forward in a book chapter authored by R. D. Lundberg and E. F. Cox, entitled *Kinetics and Mechanisms of Polymerization: Ring Opening Polymerization;* edited by Frisch and Reegen, published by Marcelt Dekker in 1969, wherein stannous octanoate is an especially preferred catalyst. The catalyst is added to the reaction mixture at a concentration level of about 100 to about 10,000 parts of catalyst per 1 million parts of ε-caprolactone. p The resultant polycaprolactone polymer has an $\overline{Mn}$ as measured by GPC of about 200 to about 50,000 more preferably about 500 to about 40,000 and most preferably about 700 to about 30,000 and a melting point from below room temperature to about 55° C., more preferably about 20° C. to about 52° C., and most preferably about 20° C. to about 50° C.

DETAILED DESCRIPTION OF THE INVENTION

The advantage of the polymers of the instant invention can be more readily appreciated by reference to the following Examples and Tables.

EXAMPLE 1

A sample of poly ε-caprolactone was prepared as follows: 19.42 milliliters of distilled ε-caprolactone was placed in a reaction vessel and to the lactone was added, 1.3 milliliters of a N,N-dimethyl-1,3-propane diamine. This combination of diamine initiator and lactone were designed to give a polymer of about 2,000 molecular weight. The material was charged and permitted to react for an extended period of time at about temperatures up to 100° where it was observed that the clear color changed to a yellowish-orange color. After a number of hours at 100° a sample was added to water without any precipitate indicating that no significant concentration of high polymer had been created. 0.05 ml. of stannous octanoate was added to the reaction mixture and the reaction was then conducted for about 2 hours at temperatures up to 150° and a sample then was added to water and a white, translucent, waxy precipitate was obtained. The reaction mixture was allowed to cool to room temperature overnight and it had solidified to a hard, waxy solid which was light in color and appearance. A melting point of the crude reaction product was observed to be from 50° to 50.5° C., a fairly sharp melting point. The resulting material was analyzed for carbon, hydrogen, and nitrogen and was found to have 62.64 percent carbon, 9.26 percent hydrogen and 1.28 percent nitrogen. The resulting material was employed as a nuetralization agent subsequently for a sulfonated EPDM derivative.

EXAMPLE 2

A sample of poly-ε-caprolactone of about 4,000 in molecular weight was prepared as follows: 100 g of ε-caprolactone was charged to a 500 ml. flask followed by the addition of 2.63 g of N,N-dimethyl-1,3-propane diamine. The temperature was increased to 100° C. where upon the white color was changed to a bright yellow color, then after about an hour at that temperature, 0.25 ml. of stannous octanoate was added. The reaction mixture was heated for about an hour to 100° C. and then the temperature was increased to a temperature of about 145° C. It was held at 145° C.,±5°, for a period of two hours, at which time the reaction was observed to have changed color and to have increased in viscosity. The reaction was then cooled to room temperature and observed to harden to a light brown wax and was removed from the flask. Melting point of the crude reaction mixture was observed to be from 53.5° to 54° C. The reaction product was observed to be approximately 106 g by weight. An analysis of the reaction product was observed to contain 62.5 percent carbon, 8.95 percent hydrogen, and 0.95 percent nitrogen.

The results above demonstrate that a polycaprolactone oligomer can be prepared which has at one end of the polymer molecule a tertiary amine group and is believed to contain at the other end a hydroxyl group. The resulting materials are demonstrated to be very useful to neutralize sulfonic acid-containing polymers such as sulfonated polystyrene or EPDM terpolymer.

It is also possible to employ as an initiator a compound terminated on one end by a tertiary amine and on the other by a hydroxyl group. This, in fact, is the reaction product of a diamine initiator (with tertiary amine and a primary or secondary amine on the same molecule) with the reaction of one or more molecules of ε-caprolactone per molecule of initiator. Such systems are also encompassed by this invention; however, the diamine initiators are the preferred systems.

What is claimed is:

1. A polycaprolactone polymer having the formula:

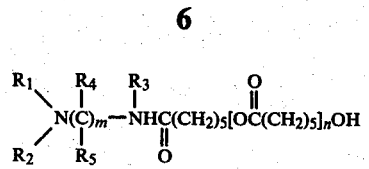

wherein $R_1$ or $R_2$ is an alkyl, cycloalkyl or aryl group, $R_3$, $R_4$ and $R_5$ is a hydrogen or alkyl, cycloalkyl, or aryl group, and m equals 1 to 20 and n equals 1 to about 500.

2. A polycaprolactone polymer according to claim 1, wherein said polymer has a melting point of about 15° C. to about 55° C. and is water insoluble.

3. A polycaprolactone polymer according to claim 1 wherein $R_1$ and $R_2$ are an alkyl group and $R_3$, $R_4$ and $R_5$ are hydrogen and m equals an integer from 1 to 20.

4. A polycaprolactone polymer according to claim 1 wherein either $R_1$ or $R_2$ is a methyl group and $R_3$, $R_4$ and $R_5$ are hydrogen.

5. A polycaprolactone polymer according to claim 1, wherein $R_1$ and $R_2$ are both methyl groups and $R_3$, $R_4$ and $R_5$ are hydrogen.

6. A polycaprolactone polymer according to claim 1, wherein $R_1$, $R_2$, and $R_3$ are methyl groups and $R_4$ and $R_5$ are hydrogen.

* * * * *